Dec. 2, 1952 T. C. NUTTALL 2,619,871

SHUTTER MECHANISM

Filed Feb. 15, 1951 3 Sheets-Sheet 1

INVENTOR.
THOMAS CAYTON NUTTALL
BY Francis W. Crotty
HIS ATTORNEY

Dec. 2, 1952 T. C. NUTTALL 2,619,871

SHUTTER MECHANISM

Filed Feb. 15, 1951 3 Sheets-Sheet 2

INVENTOR.
THOMAS CAYTON NUTTALL
BY Francis W. Crotty
HIS ATTORNEY

Dec. 2, 1952

T. C. NUTTALL 2,619,871

SHUTTER MECHANISM

Filed Feb. 15, 1951

3 Sheets-Sheet 3

INVENTOR.
THOMAS CAYTON NUTTALL
BY Francis W. Crotty
HIS ATTORNEY

Patented Dec. 2, 1952

2,619,871

UNITED STATES PATENT OFFICE 2,619,871

SHUTTER MECHANISM

Thomas Cayton Nuttall, London, England, assignor to Cinema-Television Limited, London, England, a British company Application February 15, 1951, Serial No. 211,029
In Great Britain February 27, 1950

4 Claims. (Cl. 88—19.3)

Figure 1:
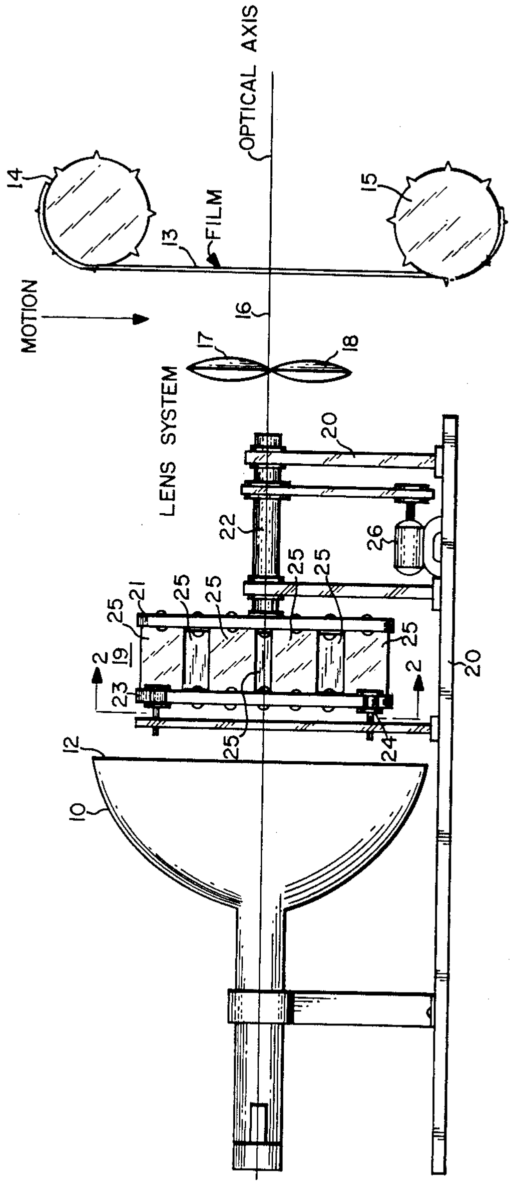

This invention relates to an improved shutter mechanism for use in a television system to assist in the interlaced flying-spot scansion of a motion-picture film.

The flying-spot type of television system comprises a cathode-ray tube in which a cathode-ray beam is developed and scanned over a fluorescent screen in a series of frames of parallel lines to produce a light spot which, in turn, scans successive picture frames of a movable film strip. When the light spot scans the film, its intensity is modulated in accordance with the shade values of the program information recorded thereon, and an intensity-modulated light beam may be formed by an appropriate lens system for conversion into electrical energy to be utilized in well-known manner for television transmission. This technique may also be employed in the reception of television signals, the light spot being used to scan a sensitized film strip to record the received image intelligence thereon.

For interlaced television transmission employing the afore-described scanning process of the film strip, each frame scansion of the fluorescent screen of the cathode-ray tube comprises at least two successive field scansions interlaced one with the other. A first lens system images the first field of each frame scansion of the fluorescent screen on successive picture frames of the film strip as the film moves across the optical path from the screen, and a second lens system images the second field of each frame scansion upon the successive picture frames, respectively interlaced with the first fields. A shutter mechanism is disposed in the optical path so that the first field of each frame scansion is directed to the first lens system and the second field of each frame scansion is directed to the second lens system.

Various forms of shutters for this purpose have been proposed, but all suffer from certain inherent disadvantages when put to practical use. The requirement for a perfect shutter for the purposes described is that it shall present in the optical path an infinite series of spaced parallel occulting strips extending across the path in a direction parallel to the scanning lines and moving across the path without any relative rotation between the strips and such scanning lines. A first approximation to such a shutter is obtained by a rotating disc centered to one side of the optical path and having peripheral teeth or segments projecting across the path so that rotation of the disc causes the segments to traverse the path. This disc has the disadvantage that its diameter must be prohibitively large for the segments to traverse the optical path with negligible relative rotation between the segments and the scanning lines.

A second and closer approximation is obtained by using a shutter in the form of a cylinder composed of alternate opaque and translucent segments, arranged so that rotation of the cylinder causes the segments successively to traverse the optical path. This arrangement obviates the afore-mentioned disadvantage of the disc, but introduces other disadvantages. The cylinder must be extraordinarily large to surround completely the cathode-ray tube so that the opaque and translucent segments may pass successively in front of the fluorescent screen; or it may be placed in front of the screen, but then the optical path must be deflected by a prism or other means mounted inside the cylinder to avoid its passing twice through the surface of the cylinder.

It is an object of the present invention to provide an improved shutter mechanism which overcomes the afore-mentioned disadvantages inherent in the prior-art shutters.

A further object of the invention is to provide an improved shutter that is compact in size and comprises a minimum of components.

The shutter of this invention comprises a rotatable ring-shaped member enclosing the afore-mentioned optical path and disposed across the path with its axis of rotation at a slight angle, for example about 15°, to the optical axis of the path. A rotatable supporting member is arranged displaced relative to the ring-shaped member in a position removed from and clear of the optical path with its axis of rotation parallel to that of the ring-shaped member. A plurality of occulting strips are arranged substantially perpendicular to the optical axis and are freely pivoted to each of the above members at points of equiangular separation and at equal radial distances from the centers of rotation of the members. And, finally, a driving mechanism is mechanically coupled to one of the members to cause the members to rotate and the occulting strips successively to traverse the optical path while maintaining their perpendicular relation with respect to the optical axis.

Figure 3:
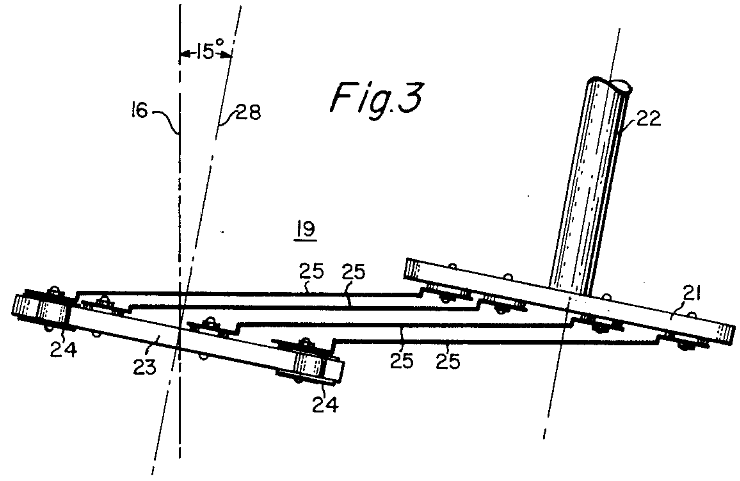
Figure 2:
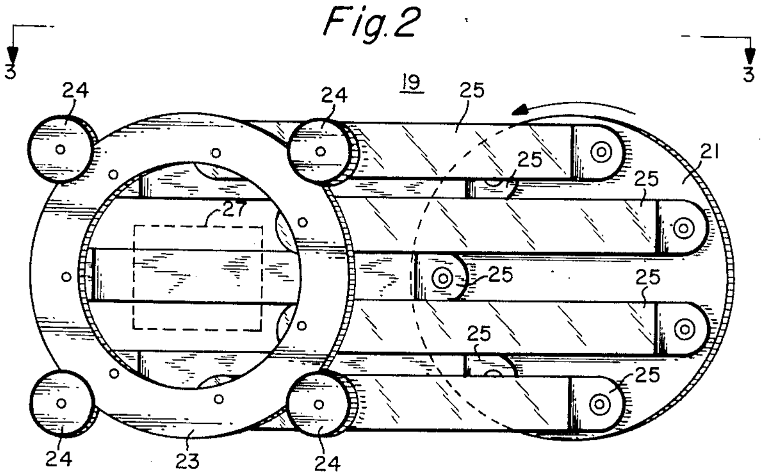

The features of this invention which are believed to be new are set forth with particularity in the appended claims. The invention itself, however, together with further objects and advantages thereof may best be understood by reference to the following description when taken in conjunction with the accompanying drawings, in which:

Figure 1 shows, partly in schematic form, a portion of a flying-spot television system incorporting the shutter mechanism of the invention, Figure 2 shows a view of the shutter taken along the lines 2—2 of Figure 1, Figure 3 shows a view of the shutter taken along the lines 3—3 of Figure 2, and, Figures 4–7 are schematic representations of an operating principle of the invention.

With reference to Figures 1–3, a television system incorporating the shutter of this invention comprises a cathode-ray tube 10 which includes an electron gun 11 for developing a cathode-ray beam, and a fluorescent screen 12 over which the beam is scanned in a series of frames of spaced parallel lines each frame consisting, for example, of two interlaced fields. The scanning of the screen may be accomplished by the usual deflecting elements and scanning systems, not shown since they may be of conventional design. A film strip 13 is supported in well-known manner by sprockets 14, 15 and is moved by any suitable driving mechanism (not shown) across the axis 16 of the optical path from screen 12. A first lens system 17, which in reality is somewhat complicated but for purposes of simplicity is shown schematically, is arranged in the optical path to image the light incident thereon upon a portion of film strip 13 corresponding, for example, to one of the successive picture frames of this film. A second lens system 18, also shown schematically, is arranged in the optical path adjacent lens 17 to image light incident thereon upon a portion of film 13 displaced from the image from lens 17 by an amount corresponding to one-half the height of the picture frame of the film. A shutter 19, constructed in accordance with the invention, extends across the optical path between the lens systems and screen 12. The shutter, in a manner to be described controls light transmission along the optical path from screen 12 to the lens system, and is synchronized with the scansion of device 10 to direct the first field of each frame scansion of screen 12 to lens 17 and the second field of each frame scansion to lens 18.

Shutter 19 includes a supporting frame 20 having a supporting member in the form of a disc 21 rotatably mounted on the frame by means of a shaft 22. The axis of rotation of disc 21 is displaced laterally from the axis of the optical path so that no portion of the disc intercepts the optical path, as indicated in Figure 3. An annular or ring-shaped member 23 is also mounted on frame 20 by means of rollers 24 for rotation about an axis parallel to the axis of disc 21. The ring-shaped member 23 encloses the optical path, represented by the broken construction line 27 in Figure 2, and is spaced axially from disc 21 for a purpose presently to be described. A plurality of occulting strips 25 are arranged substantially perpendicular to the optical axis 16 and freely pivoted to each of the members 21, 23 at points of equi-angular separation and at equal radial distances from the centers of rotation of these members. These strips, preferably, have a width equal to the spacing therebetween when in their operative position across the optical path. An electric motor 26 is mounted on frame 20 and energization of the motor rotates shaft 22 to cause the occulting strips to move successively across the optical path. The axis 28 of annular member 23 and shaft 22 of disc 21 are inclined slightly to the optical axis 16 to form an angle of approximately 15° therewith. This orientation of members 21 and 23 relative to the optical axis of the system permits continuous rotation of such members, whereas if the members were perpendicular to the optical axis, the occulting strips 25 would ultimately lock with one another and interrupt the operation of the shutter mechanism. With the illustrated orientation, the occulting strips may move freely across the optical path upon rotation of disc 21 yet extend substantially perpendicular to the optical axis and parallel to the scanning lines of screen 12.

The operation of shutter mechanism 19 may best be understood by reference to Figures 4–7. The scansion of the film strip 13 is accomplished, as previously pointed out, by means of a light spot produced by cathode-ray tube 10 as its cathode-ray scans an area of fluorescent screen 12 whose height may be represented by the line *a*—*b*. The scanned area may be imaged upon the film strip by each of the two optical systems 17, 18. These optical systems as previously mentioned, are arranged to project adjacent images of the scanned area of screen 12 on the film strip. The purpose of the shutter mechanism of which only three operative occulting strips 25*a*, 25*b*, 25*c* are indicated in Figures 4–7, inclusive, is to ensure that the appropriate optical systems are rendered effective alternately and in a desired sequence.

Figure 4:
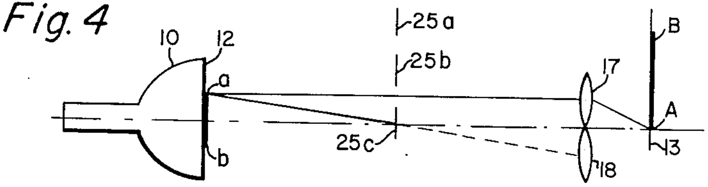

Figure 4 shows the conditions at the commencement of scanning of the first field of a frame scan for tube 10. The scanning spot at this moment is at *a* and light from this spot passes between strips 25*b* and 25*c* to optical system 17 by which it is imaged upon point A of a picture frame AB of the film strip. Occulting strip 25*c* prevents light from the scanning spot from reaching optical system 18. The film is moved downward at a constant speed so related to the frame scansion rate of tube 10 that each picture frame passes a given point in the time taken for a complete interlaced scansion of screen 12. The shutter is operated at a speed such that the occulting strips move downward an amount equal to twice their own width in the time taken for a complete interlaced scan, assuming the width of each strip to be equal to the spacing therebetween when they are in an operative position, as is preferred. The field scansion of tube 10, and the shutter and film speeds may be synchronized and correlated by any well-known means to provide the above-indicated relations.

Figure 5:
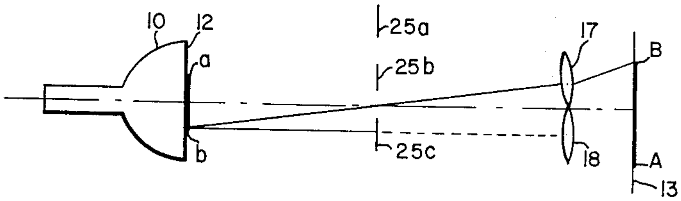
Figure 6:
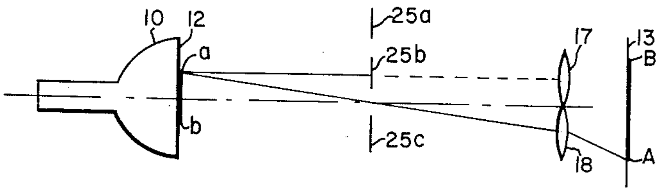

Thus, as the scanning spot moves down in one field scan, the space between strips 25*b* and 25*c* continues to allow light from the spot to reach optical system 17, and strip 25*c* occults the light from optical system 18. This continues from the beginning to the end of the first field scan of tube 10, the cathode-ray beam traveling from point *a* to point *b* of screen 12 and the light spot scanning the film strip from point A to point B as represented in Figures 4 and 5. At the completion of this field, the cathode-ray beam returns to point *a* for the second field scan of the fluorescent screen which, in accordance with known practice, is interlaced with the first field. This is illustrated in Figure 6.

Figure 7:
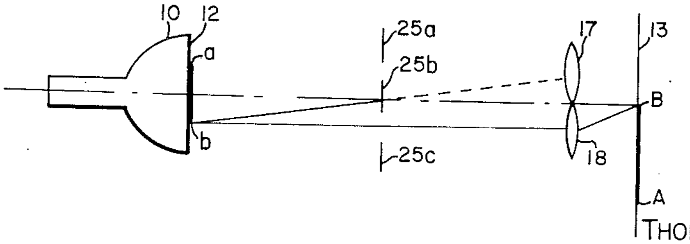

For this condition light from the scanning spot is permitted to pass between strips 25*b* and 25*c* to reach optical system 18 but is occulted from optical system 17 by strip 25*b*. This, of course, results from the continuous rotation of members 21 and 23 by motor 26 which advances the active strips of the shutter 19 across the optical path. Optical system 18 now images the spot upon the same picture frame that was scanned during the latter operation and at point A. The second, interlaced traversal of frame AB is thus commenced and proceeds as before, the occulting strips keeping pace with the scanning spot so that its light can always reach optical system 18 but is occulted from optical system 17. The condition at the end of the second traversal is illustrated in Figure 7, from which it can be seen that the image of the spot has again reached point B, completing the second scansion of the picture frame AB.

When the spot flies back again to point *a* to commence the first field traversal of the next frame to be scanned, its light is allowed to pass between strips 25*a* and 25*b* to optical system 17 and is occulted by strip 25*b* from optical system 18. The process is thus cyclically repeated, each optical system being used during alternate traversals of the scanned area of screen 12.

Although the shutter of the invention is expressly useful in a television film system, as described herein, or for the converse process of recording a television image upon a sensitized film it may also be used whenever there is a requirement for an optical path to be alternately exposed and occulted, and is particularly advantageous where an optical path of a certain area requires to be repeatedly occulted from the same direction under strictly controlled conditions.

The invention is important also for uses in which it is required that the sum of the exposed areas of two optical paths be substantially constant, while each is alternately exposed and occulted. An example of a device in which this requirement occurs is the "flicker photometer" in which an observer, or a light-sensitive device, is caused to view alternately a surface illuminated by a known luminous flux and a surface illuminated by a source whose brightness is to be measured.

The invention provides, therefore, an improved shutter mechanism that is relatively simple and expeditious to construct. A feature of the shutter of this invention is that it presents to the optical path an infinite series of spaced parallel occulting strips extending across the path and traversing the path in a direction normal to their length.

While a particular embodiment of the invention has been shown and described, modifications may be made and it is intended in the appended claims to cover all such modifications as may fall within the true spirit and scope of the invention.

I claim:

1. A shutter mechanism for controlling light transmission along an optical path comprising: a mounting structure; a rotatable ring-shaped member supported by said structure in a position enclosing said path and disposed thereacross with its axis of rotation at an angle to the optical axis of said path; a rotatable supporting member displaced relative to said ring-shaped member in a position removed from said optical path having an axis of rotation parallel to that of said ring-shaped member; a plurality of substantially equi-dimensional occulting strips arranged substantially perpendicular to said optical axis and freely pivoted at their extremities to each of said members at corresponding points of equi-angular separation and at equal radial distances from the centers of rotation of said members; and means for driving one of said members to cause said strips successively to traverse said optical path while maintaining their perpendicular relation with respect to said optical axis.

2. A shutter mechanism for controlling light transmission along an optical path comprising:

a mounting structure; a rotatable ring-shaped member supported by said structure in a position enclosing said path and disposed thereacross with its axis of rotation at an angle of substantially 15° to the optical axis of said path; a rotatable supporting member displaced relative to said ring-shaped member in a position removed from said optical path having an axis of rotation parallel to that of said ring-shaped member; a plurality of substantially equi-dimensional occulting strips arranged substantially perpendicular to said optical axis and freely pivoted at their extremities to each of said members at corresponding points of equi-angular separation and at equal radial distances from the centers of rotation of said members; and means for driving one of said members to cause said strips successively to traverse said optical path while maintaining their perpendicular relation with respect to said optical axis.

3. A shutter mechanism for controlling light transmission along an optical path comprising: a mounting structure; a rotatable ring-shaped member supported by said structure in a position enclosing said path and disposed thereacross with its axis of rotation at an angle to the optical axis of said path; a rotatable supporting disc displaced relative to said ring-shaped member in a position removed from said optical path having an axis or rotation parallel to that of said ring-shaped member; a plurality of substantially equi-dimensional occulting strips arranged substantially perpendicular to said optical axis and freely pivoted at their extremities to each of said members at corresponding points of equi-angular separation and at equal radial distances from the centers of rotation of said members; and means for driving one of said members to cause said strips successively to traverse said optical path while maintaining their perpendicular relation with respect to said optical axis.

4. A shutter mechanism for controlling light transmission along an optical path comprising: a mounting structure; a rotatable ring-shaped member supported by said structure in a position enclosing said path and disposed thereacross with its axis of rotation at an angle to the optical axis of said path; a rotatable supporting member displaced relative to said ring-shaped member in a position removed from said optical path having an axis of rotation parallel to that of said ring-shaped member; a plurality of substantially equi-dimensional occulting strips arranged substantially perpendicular to said optical axis having a width substantially equal to the spacing therebetween when in their optically operative position and freely pivoted at their extremities to each of said members at corresponding points of equi-angular separation and at equal radial distances from the centers of rotation of said members; and means for driving one of said members to cause said strips successively to traverse said optical path while maintaining their perpendicular relation with respect to said optical axis.

THOMAS CAYTON NUTTALL.

REFERENCES CITED

The following references are of record in the file of this patent:

FOREIGN PATENTS

| Number | Country | Date |
|---|---|---|
| 494,365 | Great Britain | Oct. 25, 1938 |
| 510,171 | Great Britain | July 27, 1939 |